(12) United States Patent
Galiwango et al.

(10) Patent No.: US 11,492,737 B1
(45) Date of Patent: Nov. 8, 2022

(54) METHOD FOR DISSOLVING LIGNOCELLULOSIC BIOMASS

(71) Applicant: UNITED ARAB EMIRATES UNIVERSITY, Al Ain (AE)

(72) Inventors: Emmanuel Galiwango, Al Ain (AE); Ali H. Al-Marzouqi, Al Ain (AE); Sabeera Haris, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/407,125

(22) Filed: Aug. 19, 2021

(51) Int. Cl.
| | | |
|---|---|---|
| *B27N 1/00* | (2006.01) |
| *C08H 8/00* | (2010.01) |
| *D21B 1/02* | (2006.01) |
| *D21B 1/06* | (2006.01) |
| *D04H 1/425* | (2012.01) |
| *D21B 1/04* | (2006.01) |
| *D01D 5/00* | (2006.01) |
| *D04H 1/728* | (2012.01) |
| *D01D 1/02* | (2006.01) |
| *D21B 1/16* | (2006.01) |
| *D01F 2/02* | (2006.01) |
| *B29C 69/00* | (2006.01) |
| *B29K 1/00* | (2006.01) |

(52) U.S. Cl.
CPC ........... *D04H 1/425* (2013.01); *B29C 69/001* (2013.01); *D01D 1/02* (2013.01); *D01D 5/0038* (2013.01); *D01F 2/02* (2013.01); *D04H 1/728* (2013.01); *D21B 1/021* (2013.01); *D21B 1/026* (2013.01); *D21B 1/04* (2013.01); *D21B 1/063* (2013.01); *D21B 1/16* (2013.01); *B29K 2001/00* (2013.01); *D10B 2201/01* (2013.01); *D10B 2501/04* (2013.01)

(58) Field of Classification Search
CPC .... B27N 1/00; B29C 69/001; B29K 2001/00; C08H 8/00; D01D 1/02; D01D 5/0038; D01F 2/02; D21B 1/02; D21B 1/021; D21B 1/026; D21B 1/04; D21B 1/06; D21B 1/063

USPC ............ 264/140, 330, 464, 465, 466, 484; 162/24, 76, 83, 91; 527/103
See application file for complete search history.

(56) References Cited

U.S. PATENT DOCUMENTS

| | | | |
|---|---|---|---|
| 9,493,796 B2 | 11/2016 | Medoff et al. | |
| 2011/0268652 A1* | 11/2011 | Machhammer | C07C 37/54 568/438 |
| 2012/0067763 A1* | 3/2012 | Ozawa | B32B 33/00 156/224 |

FOREIGN PATENT DOCUMENTS

| | | |
|---|---|---|
| CN | 103755975 A | 4/2014 |
| CN | 103773054 A | 5/2014 |
| CN | 103774479 A | 5/2014 |

OTHER PUBLICATIONS

Translation of CN 103112830 B (published on Jan. 28, 2015).*
Pinkert et al., "Ionic Liquids and Their Interaction with Cellulose," Chemical Reviews, vol. 109, No. 12, pp. 6712-6767, Dec. 2009. * DMSO and NaOH.
Inagaki et al., "Carbon Nanofibers Prepared via Electrospinning," Advanced Materials, vol. 24, No. 19, pp. 2547-2566, May 15, 2012. *#.

* cited by examiner

*Primary Examiner* — Leo B Tentoni
(74) *Attorney, Agent, or Firm* — Nath, Goldberg & Meyer; Richard C. Litman

(57) ABSTRACT

A method of dissolving lignocellulosic biomass waste includes obtaining raw lignocellulosic biomass waste, reducing a size of the biomass waste to provide a biomass particle size of less than about 200 μm; using dimethyl sulfoxide (DMSO), sodium hydroxide (NaOH) and trifluoroacetic acid (TFA) solvents to dissolve the biomass particles and achieve a dissolved lignocellulose solution. The present method dissolves at least about 94% of the lignocellulose fraction in the waste biomass. In an embodiment, the biomass particle size can be about 180 μm.

13 Claims, 3 Drawing Sheets

METHOD FOR DISSOLVING LIGNOCELLULOSIC BIOMASS

BACKGROUND

1. Field

The disclosure of the present patent application relates to a method for dissolving lignocellulosic biomass, and particularly, to a method for dissolving lignocellulosic biomass that can be used for preparing polymeric nanofibers.

2. Description of the Related Art

Lignocellulosic biomass refers to plant dry matter. Lignocellulosic waste biomass is a by-product of agricultural and forestry processing of plant dry matter. Lignocellulosic waste biomass is a renewable source widely available in many parts of the world. The waste is generated in huge amounts and is currently used in low value applications, such as compost, art, and crafts.

Lignocellulosic biomass consists mainly of cellulose, hemicellulose and lignin components that possess polymeric properties. As such, lignocellulosic waste biomass is an ideal candidate for bio-based renewable applications such as biofuels, medical equipment, and medicine. The carbohydrate polymers, cellulose and hemicellulose, are tightly bound to lignin, an aromatic polymer. Due to this complex structure of lignocellulose, dissolution of lignocellulose remains a challenging task.

Lignocellulose exhibits poor solubility in most existing solvents (especially for the cellulose fraction). In addition, conventional techniques for dissolving lignocellulose leave significant parts of the biomass underutilized or unutilized, thus making the process uneconomical for commercial scale up.

Thus, a method for dissolving lignocellulosic biomass solving the afore-mentioned problems are desired.

SUMMARY

A method for dissolving lignocellulosic biomass includes obtaining a raw lignocellulosic biomass waste sample, reducing a size of the biomass waste to provide a biomass particle size of less than about 200 µm, and preparing a dissolved lignocellulose solution using dimethyl sulfoxide (DMSO), sodium hydroxide (NaOH) and trifluoroacetic acid (TFA). A method for preparing lignocellulosic waste-based polymer nanofibers can include electrospinning the dissolved lignocellulose solution to generate the polymer nanofibers. The nanofibers can be used to make biodegradable products typically made from non-biodegradable materials.

These and other features of the present subject matter will become readily apparent upon further review of the following specification.

DETAILED DESCRIPTION OF THE PREFERRED EMBODIMENTS

A method of dissolving lignocellulosic biomass waste includes obtaining raw lignocellulosic biomass waste, reducing a size of the biomass waste to provide a biomass particle size of less than about 200 µm; and using dimethyl sulfoxide (DMSO), sodium hydroxide (NaOH) and trifluoroacetic acid (TFA) solvents to dissolve the biomass particles and achieve a dissolved lignocellulosic solution. The dissolved lignocellulosic biomass solution can have a contact angle up to about 75°. The present method dissolves at least about 94% of the lignocellulose fraction in the waste biomass.

Figure 3:
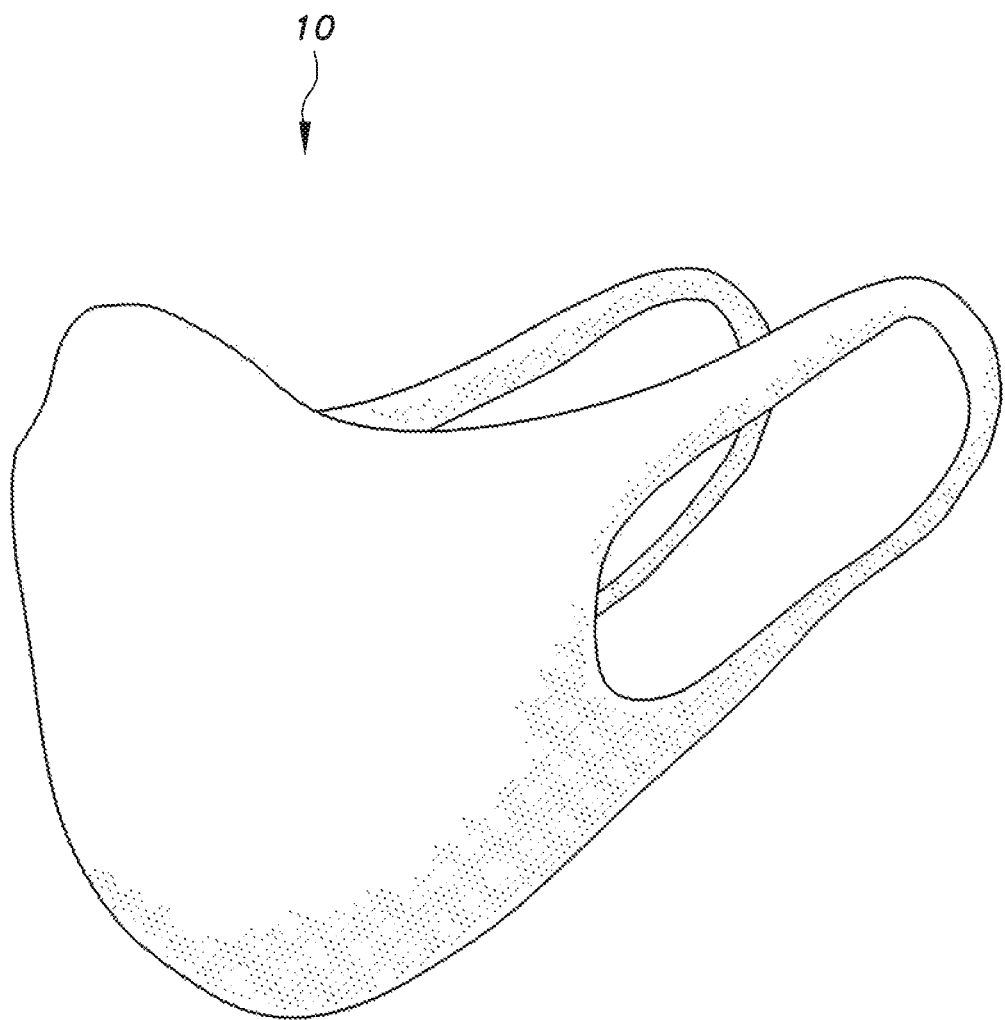
FIG. 3 shows an exemplary face mask made from nanoparticles prepared according to the present teachings.

In an embodiment, lignocellulosic waste-based polymeric nanofibers can be produced by electrospinning the dissolved lignocellulosic solution. The nanofibers can have a diameter ranging from about 100 nm to about 10 µm. In an embodiment, the nanofibers can be used to make a biodegradable, breathable face mask that is configured to cover the nose and mouth to protect the user from inhaling airborne viral particles and other pollutants. An embodiment of an exemplary face mask is shown if FIG. 3.

In an embodiment, the raw lignocellulosic biomass waste can be obtained from date palm. In an embodiment, the lignocellulosic biomass waste is obtained from the rachis of a date palm. The biomass waste can be reduced in size to achieve a particle size of about 180 µm. The biomass particles can then be dried and an extractives content of the resulting biomass powder can be reduced (e.g., by treatment with a 1:2 v:v solution of ethanol and benzene in a Soxhlet extractor for about 48 hours) to provide an extractives-free powder. In an embodiment, a polar solvent can be added to the extractives-free powder to provide a biomass waste solution and a base can be added to the biomass waste solution to provide a semi-dissolved mixture. In an embodiment, the polar solvent is dimethyl sulfoxide (DMSO). In an embodiment, about 10 ml of DMSO can be added to about 1 gram of the extractive-free date palm powder. In an embodiment, the base is aqueous sodium hydroxide (NaOH). The semi-dissolved mixture can be heated (at about 85° C. for about 1 hour) while stirring (e.g., at about 600 rpm) to dissolve cellulose in the mixture. After dissolution of cellulose, the mixture can be cooled to room temperature and an acid can be added to the cooled mixture. The acid-treated mixture can be heated under constant stirring (e.g., about 250 rpm for about 1 hour) to achieve about 94% to about 100% dissolution of lignin and cellulose in the mixture. In an embodiment, the acid is trifluoroacetic acid (TFA). In an embodiment, about 10 ml of TFA is added to the mixture.

Unlike prior methods that involve dissolving cellulose and lignin from the biomass independently, the present method includes the step of reducing the lignocellulosic waste to a powder with particle sizes of less than about 200 microns, e.g., about 180 microns, and then dissolving the lignocellulose using the solvents described above. The present method dissolves at least about 94% of the lignocellulose fraction in the waste biomass and the resulting dissolved lignocellulose solution can provide properties desirable for various applications.

The dissolved lignocellulosic solution can be used to make lignocellulosic waste-based polymer nanofibers by electrospinning the dissolved lignocellulosic solution to produce the lignocellulosic waste-based nanofibers. The electrospinning can be conducted at room temperature using a voltage range of about 15 kV-40 kV and a flow rate ranging from about 0.01 mLmin$^{-1}$ to about 1 mLmin$^{-1}$. The electrospinning process can generate nanofibers with a particle size diameter ranging from 100 nm to 10 μm. The lignocellulosic waste-based nanofibers can be used for preparing various biodegradable products such as face masks, fire blankets, and oil spill absorbents. The nanofibers can be used to make biodegradable products using any suitable method, including, for example, hand-weaving, injection molding, and compression molding. In an embodiment, the lignocellulosic waste-based nanofibers can be used to prepare a biodegradable face mask (FIG. 3) that can be worn over the face to control the spread of diseases and environmental pollutants.

Lignocellulosic waste-based polymer nanofibers prepared according to the present method can provide an ideal replacement for non-biodegradable plastics, wooden products, or fuel-based organics. The present method can be more cost effective and sustainable than conventional processes that utilize more petroleum-based raw materials and more corrosive chemicals to dissolve lignocellulose complexes.

As used herein, the term "about," when used to modify a numerical value, means within ten percent of that numerical value.

The present teachings are illustrated by the following examples.

Example 1

Dissolving Lignocellulosic Biomass

Lignocellulosic biomass was obtained from the rachis part of date palm waste. The date palm waste was collected from UAE University, Al Foah farm. Other chemicals were purchased from sigma Aldrich.

The samples were pruned from mature (>10 years) date palm trees. Farm dirt was cleaned off prior to mechanical size reduction of the samples using a high-speed electric grinder. The samples were sieved using an automatic shaker to achieve samples with particle sizes of about 180 μm. The samples were then dried in an oven at 105° C. overnight to equilibrate their moisture contents prior to further pretreatment steps. The biomass was treated with ethanol and benzene (1:2, v:v) in a Soxhlet extractor for 48 h to reduce extractives content that prevents chemical accessibility to the lignocellulose complex.

DMSO (10 ml) was added to 1 g of the extractive-free date palm powder, followed by 5 ml of NaOH$_{aq}$. The mixture was heated at 85° C. for 1 h under constant stirring at 600 rpm. After dissolution of cellulose, the mixture was cooled to room temperature and thereafter 10 ml of TFA was added to the mixture. The mixture was then heated under constant stirring at 250 rpm for 1 h. A control experimental run was performed on the commercial sample and the combination of lignin and cellulose. This commercial combination was used due to unavailability of a commercial lignin-hemicellulose-cellulose combination on the market. The lignin-cellulose ratio in this combination was 1:1 (wt/wt). When the commercial lignin-cellulose combination was treated using the present method, a 100% dissolution was observed after the first attempt. When the date palm powder was used in the present method, however, 94% and 100% dissolution was achieved on the first and second attempts, respectively.

Example 2

Wettability and Contact Angle

Contact angle measurements were performed to investigate material surface characteristics such as wettability, adhesion, and absorption. The results show contact angle of the commercial lignin-cellulose and date palm solution being 29.53°±0.02 and 58.20°±0.01, respectively. These results indicate that the dissolved commercial lignin-cellulose combination is highly hydrophilic and the date palm solution is hydrophobic. The hydrophilic nature signifies an influential interaction mainly from —OH cellulose groups. Therefore, use of the selected co-solvents solved ambiguous cellulose properties that often result in incompatibility with hydrophobic materials such as lignin. The degree of wettability observed on the glass slide and the contact angle results was found suitable for the electrospinning process. However, to enhance the properties of the final product, the solution's hydrophobicity needed to be improved and more inter-surface measurements, such as rheological properties needed to be performed.

Example 3

Rheological Properties

Rheological tests were performed using the Discovery Hybrid Rheometer HR-2 (TA Instruments, New Castle, Del., USA). A geometry cone plate (50-mm diameter, 1° cone angle, 50 μm gap) with plate-controlled temperature (25±0.1° C.) was used. The apparent viscosity (η) and shear stress (τ) of the dissolved lignocelluloses solutions were measured as a function of shear rate (γ) from 10 to 1000 s$^{-1}$ at 25±0.1° C. Then power law model was used to describe the flow curves of the solutions using equation 1.

$$\tau = m\gamma^n \quad (1)$$

where, τ is shear stress (Pa), m is the consistency coefficient, γ is the shear rate (s$^{-1}$) and n are the flow behaviour index.

The linear viscoelastic region of dissolved solutions was determined by the amplitude sweep test in a strain range of 0.1-100% at 25±0.1° C. The structural deterioration of solutions was examined at low and high shears. The oscillation-time test at a frequency of 1.0 Hz, was used to measure the storage (G') and loss (G") moduli. The changes in viscosity (η) of solutions were determined at temperatures ranging from 10° C. to 80° C. The measurement was performed using heating rate of 3° C./min at a constant shear rate of 20 s$^{-1}$.

Figure 1A:
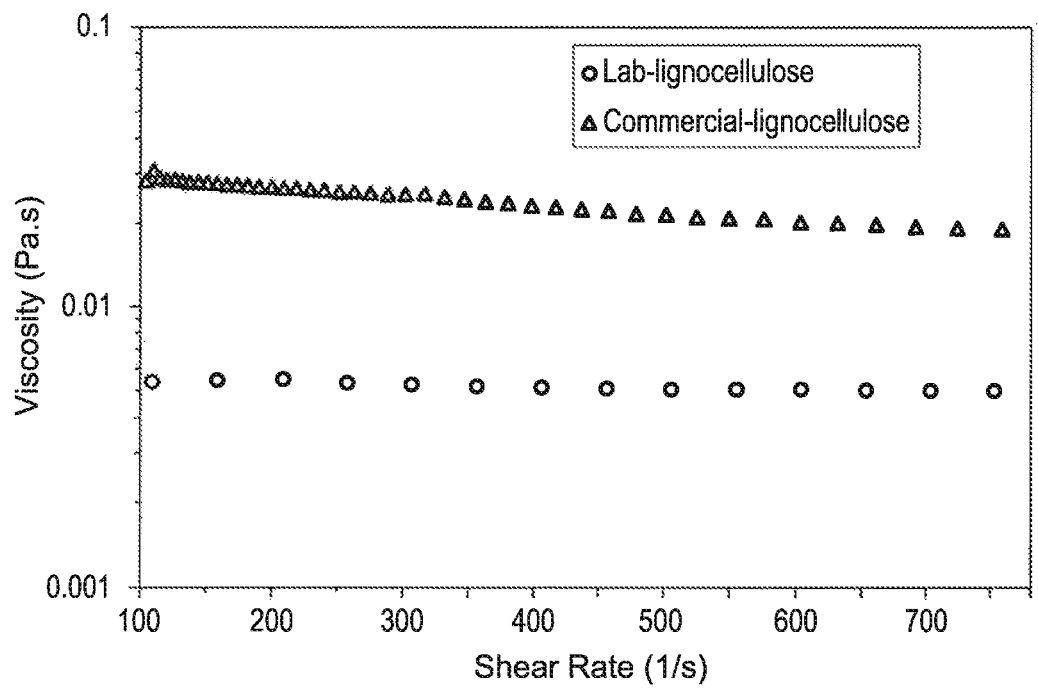
FIG. 1A is a graph showing rheological measurements of apparent viscosity according to the present teachings.
Figure 1B:
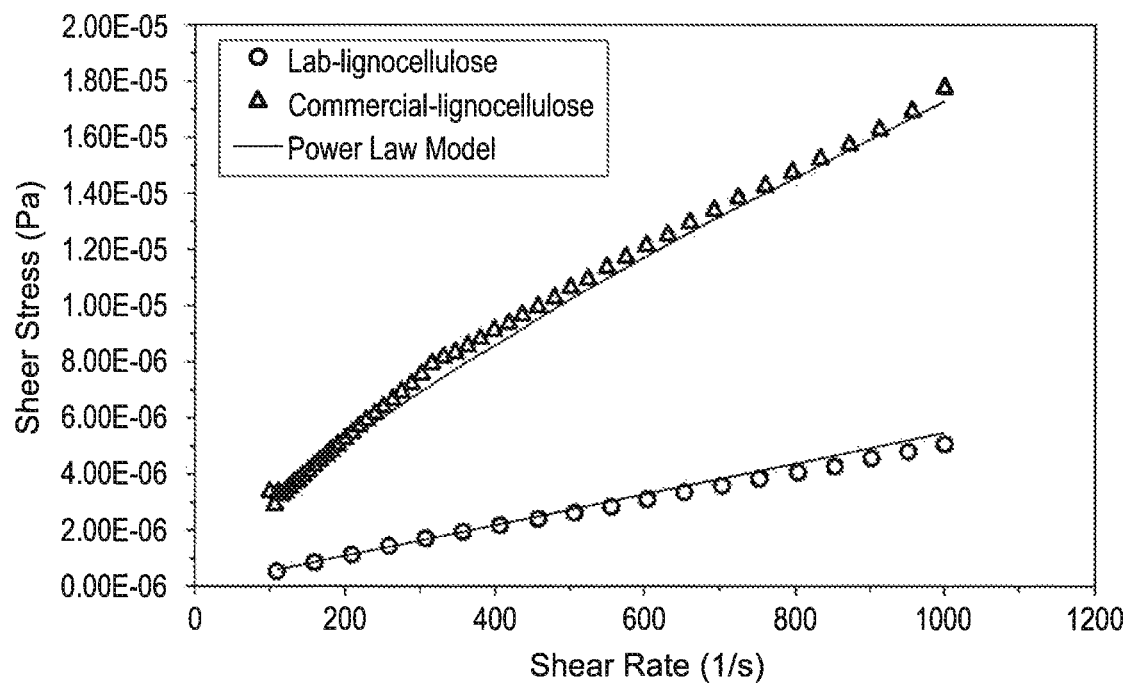
FIG. 1B is a graph showing rheological measurements of a model fitting of date palm waste and commercial lignocellulose according to the present teachings.
Figure 2A:
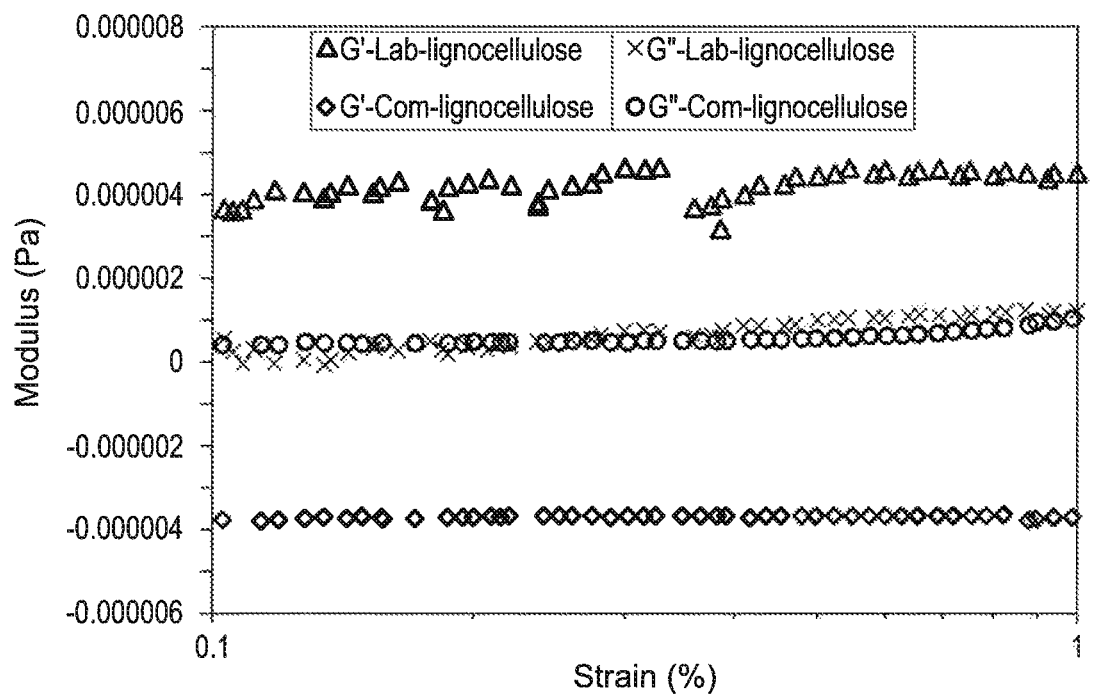
FIG. 2A is a graph showing the effect of oscillation amplitude on storage and loss moduli of date palm waste and commercial lignocellulose according to the present teachings.
Figure 2B:
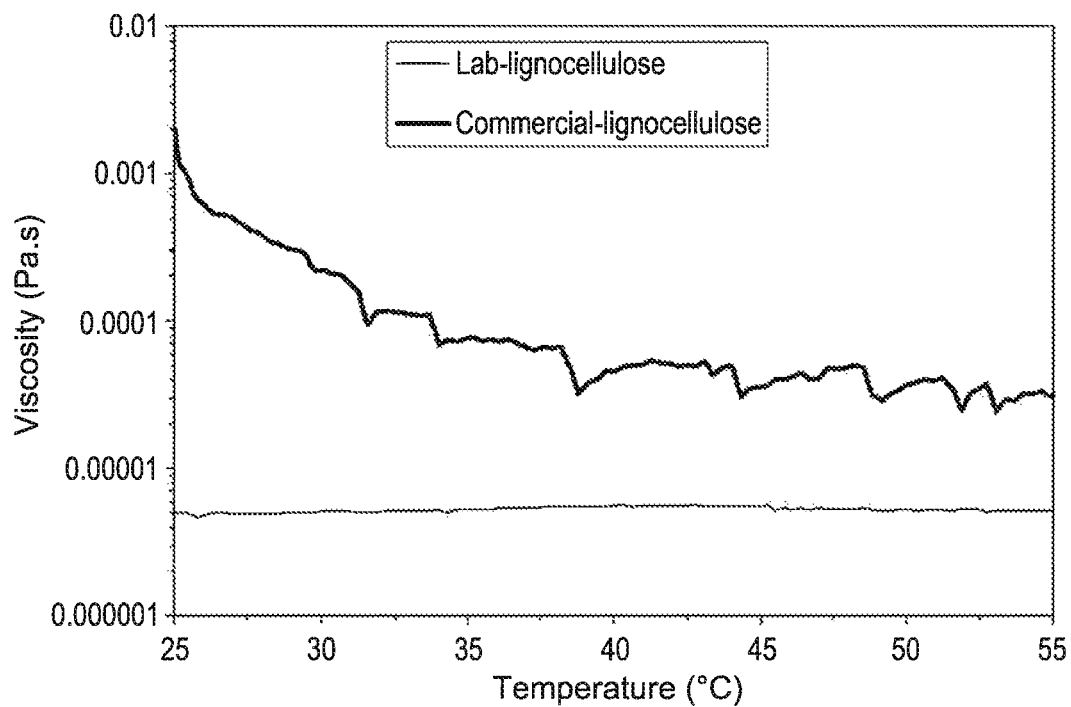
FIG. 2B is a graph showing the effect of temperature on viscosity of date palm waste and commercial lignocellulose solutions.

The apparent viscosity of both date palm and commercial solution samples (FIG. 1A) decreased with an increase in shear rate, signifying a non-Newtonian shear-thinning behaviour. The power law model (FIG. 1B) fit well with $R^2=0.9958$ and $R^2=0.9964$ for date palm solution ("lab lignocellulose") and commercial lignin-cellulose ("com-lignocellulose"), respectively. The perfect fitting model is evidence of non-Newtonian (pseudoplastic) behaviours for the dissolved solutions. Commercial samples deviated from Newtonian behaviour with n=0.7612, whereas the date palm solution was closest with flow index n=0.9862. The amplitude sweep test was performed to detect the linear range of the storage (G') and loss (G") moduli. The linear viscoelastic behaviour ranged from 0.1 to 1.0% strain (FIG. 2A). The storage (G') and loss (G") moduli revealed that both solutions do not possess significant thixotropic behaviours. The solutions have less ability to rebuild their structure after applying a high shear for a short time. The thermal properties are important in many downstream applications, such as solution mixing in paint industry, electrospinning process, and food industry. FIG. 2B is a graph showing viscosity dependence on temperature. The differences in η for commercial solutions was recognized at temperature<40° C. This was attributed to weak intermolecular linkages affected by thermal energy. The viscosity for date palm solution was largely constant across the investigated temperature range.

The results of rheological properties are useful in determining the appropriate conditions, such as solution concentration, viscosity, temperature, spinning distance and flow rate, required during the electrospinning process. For experimental demonstration purposes, electrospinning was tested for the dissolved lignocellulose waste biomass.

Example 4

Electrospinning

The objective of the electrospinning step was to investigate the formation of nanofibers. Electrospinning is a simple and efficient technique for the fabrication of interconnected micro- and nanosized polymer fibers for various applications. Although it was first patented in 1934, it has received greater attention since the 1990's and it has also been applied at an industrial level (Prasanth, et al., 2014). Unlike other fiber-spinning techniques like melt spinning or dry spinning, that rely on mechanical forces to produce fibers by drawing the polymer through a spinneret, this technique depends on electrostatic forces (Ko and Wan, 2014). A known electrospinning procedure was adopted for the dissolved lignocelluloses (Inagaki, et al., 2012). The dissolved biomass solutions were loaded into a syringe (15 ml) which was then connected to a pump offering a controlled flow rate. The metallic needles of the syringes were connected to a metallic collector through a high-voltage power supply. As the solution was pumped through the needle, it was subjected to the electrostatic force from the electric field between the syringes and the collector. The shape of the pendant polymer droplet was then transformed into a cone (termed as the "Taylor cone"). When the electrostatic force overcame the surface tension of the polymer solution, a jet was formed, which immediately broke into several smaller jets. The jets followed the looping trajectories and fell on the collector. During the ejection, the solvents used to dissolve the biomass evaporated and the jet was transformed into polymer fibers, which were solid and smooth. In a typical setup, the fibers are randomly oriented, and they form a nonwoven mat. However, variations of the collector allow the formation of aligned fibers (e.g., using a rotating drum) (Inagaki, et al., 2012). Other variations of the setup allow the formation of core/shell structured fibers, in which the core polymer is different from the shell polymer, or hollow fibers (Zhang, et al., 2016). However, in the tested designed set-up, typical vertical arrangement produced random nano fiber orientation with porous structures.

It is to be understood that the method for dissolving lignocellulosic biomass waste is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for dissolving lignocellulosic biomass waste, comprising:
    providing raw lignocellulosic biomass waste;
    reducing a size of the biomass waste to provide a biomass particle size of less than about 200 μm;
    reducing an extractives content of the biomass particles to provide an extractives-free powder;
    adding a polar solvent to the extractives-free powder to provide a biomass waste solution;
    adding a base to the biomass waste solution to provide a semi-dissolved mixture;
    heating the semi-dissolved mixture while stirring;
    cooling the semi-dissolved mixture to room temperature after heating;
    adding acid to the cooled semi-dissolved mixture to provide an acid-treated mixture;
    heating the acid-treated mixture while stirring to provide a dissolved lignocellulose solution;
    electrospinning the dissolved lignocellulose solution to generate polymer nanofibers.

2. The method for dissolving lignocellulosic biomass waste as recited in claim 1, wherein the biomass particle size is about 180 μm.

3. The method for dissolving lignocellulosic biomass waste as recited in claim 1, wherein the polar solvent is dimethyl sulfoxide.

4. The method for dissolving lignocellulosic biomass waste as recited in claim 1, wherein the base is aqueous sodium hydroxide (NaOH).

5. The method for dissolving lignocellulosic biomass waste as recited in claim 1, wherein the acid is trifluoroacetic acid.

6. The method for dissolving lignocellulosic biomass waste as recited in claim 1, wherein the raw lignocellulosic biomass waste is obtained from date palm.

7. A method for preparing lignocellulosic waste-based polymer nanofibers, comprising electrospinning the dissolved lignocellulose solution prepared in claim 1.

8. A method for preparing lignocellulosic waste-based polymer nanofibers, comprising:
    providing raw lignocellulosic biomass waste;
    reducing a size of the biomass waste to provide a biomass particle size of less than about 200 μm;
    reducing an extractives content of the biomass particles to provide an extractives-free powder;
    adding a polar solvent to the extractives-free powder to provide a biomass waste solution;
    adding a base to the biomass waste solution to provide a semi-dissolved mixture;
    heating the semi-dissolved mixture while stirring;
    cooling the semi-dissolved mixture to room temperature after heating;
    adding an acid to the cooled semi-dissolved mixture to provide an acid-treated mixture;
    heating the acid-treated mixture while stirring to provide a dissolved lignocellulose solution;
    electrospinning the dissolved lignocellulose solution to generate the polymer nanofibers.

9. The method for preparing lignocellulosic waste-based polymer nanofibers as recited in claim 8, wherein the biomass particle size is about 180 μm.

10. The method for preparing lignocellulosic waste-based polymer nanofibers as recited in claim 8, wherein the polar solvent is dimethyl sulfoxide.

11. The method for preparing lignocellulosic waste-based polymer nanofibers as recited in claim 8, wherein the base is aqueous sodium hydroxide (NaOH).

12. The method for preparing lignocellulosic waste-based polymer nanofibers as recited in claim 8, wherein the acid is trifluoroacetic acid.

13. The method for preparing lignocellulosic waste-based polymer nanofibers as recited in claim 8, wherein the raw lignocellulosic biomass waste is obtained from date palm.

\* \* \* \* \*